US006747607B1

(12) United States Patent
Eckhardt et al.

(10) Patent No.: US 6,747,607 B1
(45) Date of Patent: Jun. 8, 2004

(54) RADIATION POWER LIMITER

(75) Inventors: Wilfried O. Eckhardt, Malibu, CA (US); Weldon S. Williamson, Malibu, CA (US)

(73) Assignee: The Directv Group, Inc., El Segundo, CA (US)

( * ) Notice: Subject to any disclaimer, the term of this patent is extended or adjusted under 35 U.S.C. 154(b) by 735 days.

(21) Appl. No.: 07/172,120

(22) Filed: Feb. 12, 1988

(51) Int. Cl.[7] .......................... H01Q 15/02; G01J 5/02; G02B 5/08; G01S 13/00

(52) U.S. Cl. .............. 343/909; 250/237 R; 250/339.01; 359/351; 342/53

(58) Field of Search ........................... 343/909; 342/53, 342/54; 350/452; 250/237 R, 339.01, 339.14; 359/350, 351

(56) References Cited

U.S. PATENT DOCUMENTS 2,840,811 A * 6/1958 McMillan ................... 343/909
2,972,743 A * 2/1961 Svensson et al. ........... 343/909
3,231,663 A * 1/1966 Schwartz .................... 343/909
3,231,892 A * 1/1966 Matson et al. .............. 343/909
3,523,721 A * 8/1970 Hofmann .................... 350/452
3,701,158 A * 10/1972 Johnson ...................... 343/725
4,477,814 A * 10/1984 Brumbaugh et al. ........ 343/725
4,574,288 A * 3/1986 Sillard et al. ............... 343/909
4,800,868 A * 1/1989 Appeldorn et al. ......... 350/452

* cited by examiner

*Primary Examiner*—Stephen C. Buczinski
(74) *Attorney, Agent, or Firm*—Georgann S. Grunebach; John A. Crook, III

(57) ABSTRACT

Disclosed herein is an arrangement for shielding electronic sensors from undesired microwave or millimeter wave radiation. In this arrangement, reflective element is disposed in the sensor path to intercept incoming signals. The reflective element has a pluraity of adjacent parallel ridges therein having sloped faces angled for reflecting incoming desired infrared radiation onto the sensor. The width of the ridges are selected so that desired signals will be reflected by the sloped ridge faces but undesired microwave or millimeter radiation will be reflected by the overall major surface of the mirror. Accordingly, undesired microwave or millimeter radiation will be reflected away from the sensor by the overall front major surface thereby preventing the sensor from being damaged.

9 Claims, 4 Drawing Sheets

Fig. 1.
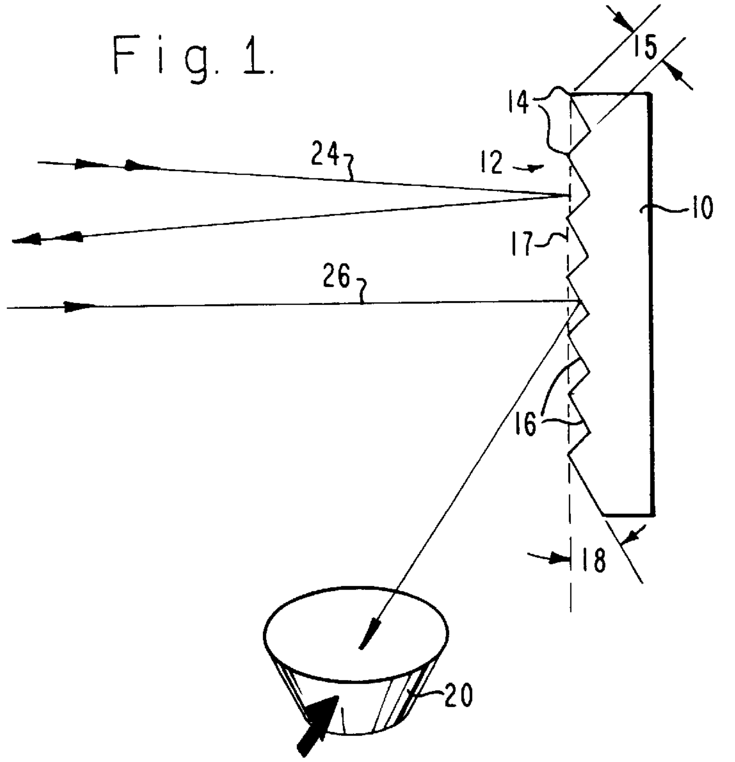
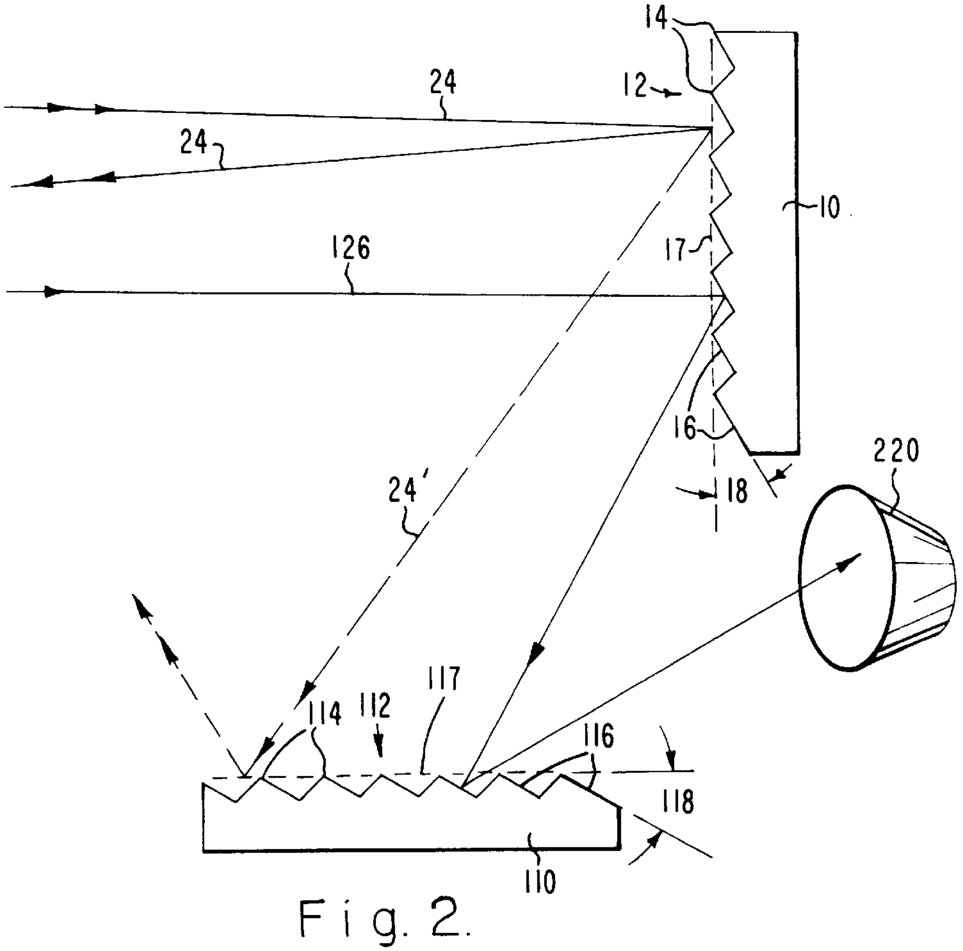
Fig. 2.

Fig. 3.
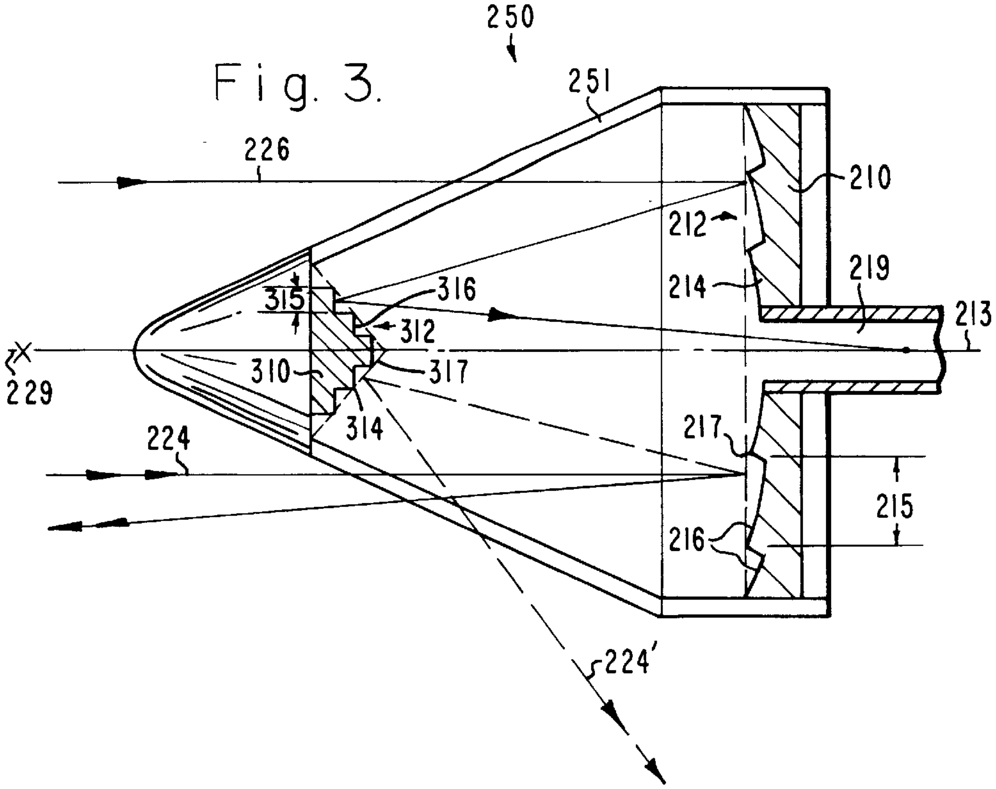
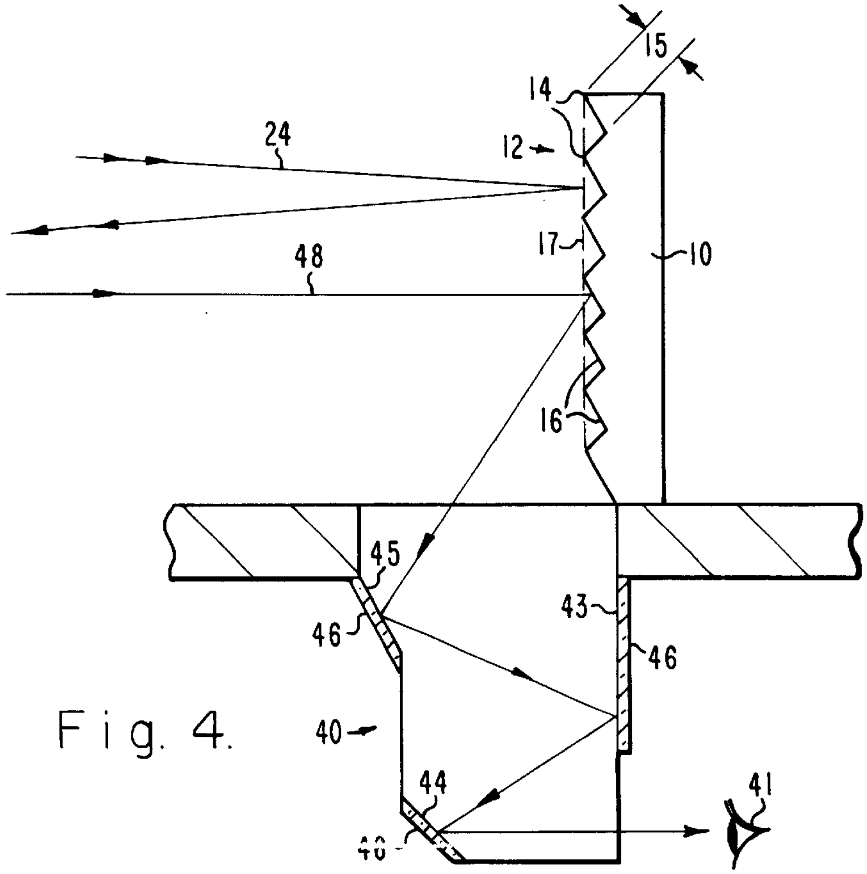
Fig. 4.

RADIATION POWER LIMITER

BACKGROUND OF THE INVENTION

1. Field of the Invention This invention relates generally to nonionizing radiation damage protection and more particularly to arrangements for shielding electronic and biological sensors and also electronic components from damaging microwave and millimeter wave radiation.

2. Statement of Related Art

Electronic sensors and electronic components are basic elements in radar systems, communication systems, guidance mechanisms, aircraft, and surveillance equipment deployed throughout the earth's environment and also in space. Sensors and electronic components (especially VLSI circuits) are fragile and susceptible to disorientation or destruction by undesirable concentrated pulses of microwave or millimeter wave radiation. For example, a naked sensor could be irradiated with sufficient microwave energy from a traveling-wave tube to damage it or its supporting electronics. Presently transparent conductive coatings and meshes have been developed to shield electronic sensors and components. These coatings and meshes, however, have limited power handling capabilities. Improved devices, therefore, are needed to protect such components from undesired microwave or millimeter radiation that could be directed onto sensors or electronic components and damage them. Furthermore, these devices must be able to protect sensors over quite a broad bandwidth, preferably including both microwave and millimeter wave ranges. Any shielding arrangement, however, must be simple and not affect the normal functioning of the sensors or electronics.

Furthermore, since biological sensors, namely the human eye, could also be subjected to damaging microwave and millimeter wave radiation, shielding arrangements are also needed to protect these sensors.

SUMMARY OF THE INVENTION

It is therefore an object of the present invention to provide a sensor protection arrangement capable of shielding a sensor or electronic components from concentrated microwave and millimeter wave radiation.

It is a further object of the present invention to provide a sensor protection arrangement that is simple and easy to manufacture.

It is an advantage of the sensor protection arrangement that it can be retrofit into existing equipment.

In accordance with the foregoing objects, a sensor protection arrangement for protecting electronic and biological sensors and also sensitive electronic components from undesired microwave or millimeter wave radiation includes a reflective element having a major surface which in turn has a plurality of adjacent parallel ridges therein. Each ridge has an inclined face of a predetermined width which is substantially less than the wavelength of the undesired radiation. Consequently, these inclined ridge faces will tend to reflect only signals having wavelengths significantly less than any undesired microwave or millimeter wave radiation; while undesired signals with wavelengths significantly greater than the width of the inclined ridge faces will be reflected by the overall major surface of the reflective element. The inclined ridge faces are sloped so that desired incoming signals are directed toward a sensor. On the other hand, the front major surface is oriented with respect to the sensor so that undesired microwave or millimeter wave radiation will be directed by the overall front major surface away from the sensor (or other electronic components).

In another aspect, a sensor protection arrangement includes a honeycomb-like structure. The honeycomb-like structure is composed of a plurality of adjacent cells, each cell having a preselected cross-selectional area and length. The cross-sectional area and length of the cells are preselected to substantially attenuate signals with wavelengths greater than infrared wavelengths, namely undesired microwave or millimeter wave signals. However, signals in the infrared region pass through the cells substantially unattenuated to a sensor located behind the honeycomb device.

BRIEF DESCRIPTION OF DRAWINGS

FIG. 1 is a side view of a sensor protection arrangement according to the invention.

FIG. 2 is a side view showing a modified embodiment of the invention.

FIG. 3 is a partial cross-sectional side view of a missile dome showing a modified embodiment of the sensor protection arrangement.

FIG. 4 is a cross-sectional side view of still another different embodiment of the sensor protection arrangement.

FIG. 6 is a cross-sectional side view of a forward looking infrared dome showing one example of the sensor protection arrangment in. FIG. 5.

DETAILED DESCRIPTION

Figure 5:
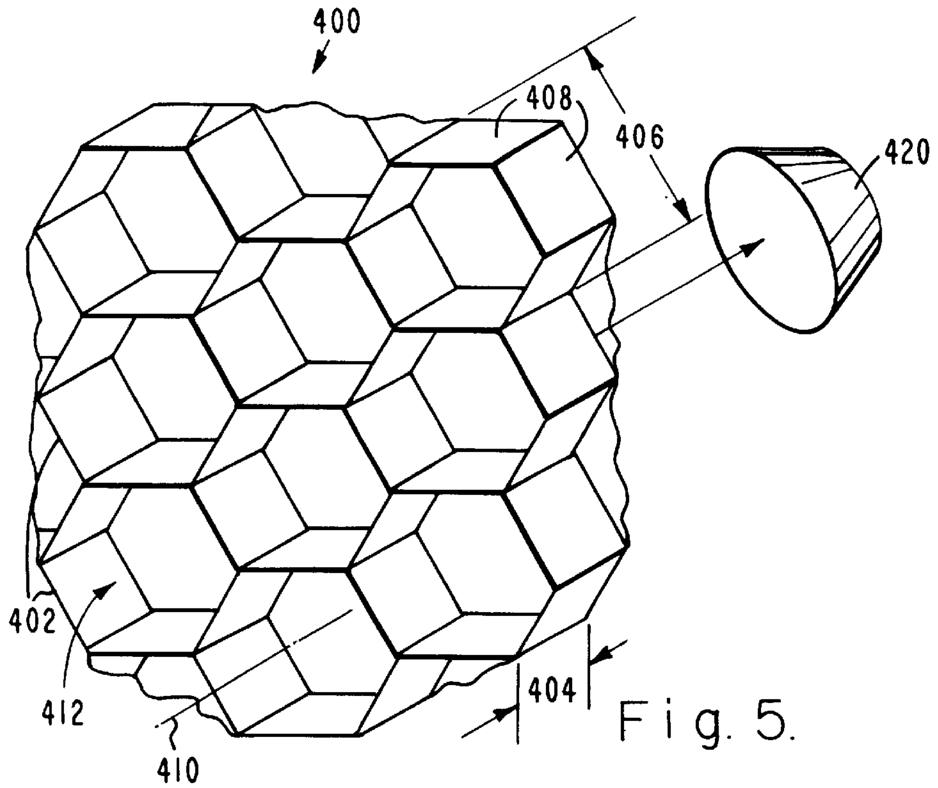
FIG. 5 is a perpective view illustrating an alternative embodiment of a sensor protection arrangement.

Referring with greater particularity to FIG. 1, a sensor protection arrangement according to the invention includes a reflective element 10 which has a front major surface 12. Front major surface 12 has a plurality of parallel ridges 14 therein. Each ridge 14 has a inclined face 16 which form essentially flat but sloped elongated reflective surfaces.

The width 15 of inclined faces is selected to be substantially less than the wavelength of the undesired millimeter or microwave signals that pose a hazard to the sensor or system being protected. In other words, the width 15 of the inclined faces 16 must be small compared to the undesired wavelength such that the undesired signals are specularly reflected by the overall front major surface of reflective element 10 as defined by plane 17. On the other hand, the width 15 of inclined faces 16 is selected to be substantially greater than the wavelength of desired signals, so that these signals may be specularly reflected by the inclined faces 16. Desired signals typically have wavelengths within the operating range of the sensor 20. Preferably, the width 15 of inclined faces 16 may be less than about two-tenths the wavelength of the shortest undesired signal but greater than about twice the wavelength of desired signals. The width 15 of inclined faces, however, may be varied to satisfy the shielding needs of the particular system in which case reference may be made to L. Genzel and W. Eckhardt, Zeitschrift fuer Physik. 139 (1954) page 581, which is incorporated herein by reference. As an example, to protect infrared and visible-light sensors, which typically operate at wavelengths of about 30$\mu$m(0.03 mm) or less, against undesired microwave radiation having wavelengths greater than about 3 mm, the inclined face width 16 may be about 0.3 mm.

The reflective element 10 is positioned so that incoming signals are caused to impinge on the front surface 12 of reflective element 10 preferably essentially normal thereto. As a result, undesired signals specularly reflected by overall front major surface 17 will be directed back toward the direction of its origin, as depicted by signal ray 24. Sensor 20 is located in front of and to the side of reflective element 10 for receiving desired signals reflected specularly from inclined faces 16. Accordingly, the inclined faces 16 are sloped to direct desired signals toward sensor 20, as depicted by signal ray 26. Sensor 20 may be either an electronic sensor or a biological sensor.

Reflective element 10 may be easily made by extruding a flat piece of plastic to form parallel ridges 14 therein. Alternatively, ridges 14 may be cut. Thereafter these ridges may be coated with aluminum for high reflectivity.

Other optical elements may be used in conjunction with reflective element 10 to adjust the path of incoming signals before they impinge on the front major surface 12 of the reflective element 10. For example, a collimating lens (not shown) may be positioned in the path of incoming signals and cause them to impinge on the front major surface of the reflective element, essentially normal thereto.

Likewise, optical elements may be used to adjust the signal path of desired signals reflected from the inclined faces 16. For example, as illustrated in FIG. 4, a transparent block 40 may be positioned adjacent to and in front of reflective element 10 for receiving desired signals reflected from inclined faces 16 and directing these signals along a predetermined path into sensor 41, which in this case is illstrated as a human eye. In the example, block 40 is a transparent body of material such as glass with three sides 43, 44 and 45 coated with reflective material 46 such as silver or aluminum. Sides 43, 44 and 45 are arranged to direct desired signals to sensor 41 as depicted by signal ray 48.

A second reflective element may be added to the sensor protection arrangement described above with reference to FIG. 1, thereby adding an additional degree of protection. As shown in FIG. 2, second reflective element 110 has parallel ridges 114 similar to ridges 14 of first reflective element 10. Second reflective element 110 is postioned with respect to first reflective element 10 such that desired signals 126 reflected from inclined faces 16 of reflective element 10 are caused to impinge on front major surface 112 of second reflective element 110. Inclined faces 116 of second reflective element 110 are sloped such that desired signals are reflected toward sensor 220, as depicted by signal ray 126. As discussed above, undesired signals typically are reflected by overall front major surface 17 of first reflective element 10 back toward their origin. However, should any undesired signals 24 be non-specularly reflected (e.g., scattered) by front major surface 12 toward second reflective element 110, these undesired signals will be specularly reflected by overall front major surface 117 away from sensor 220, as depicted by dashed signal ray 24'.

In the embodiment shown in FIG. 3, two circularly shaped reflective elements 210 and 310 are arranged inside a forward looking infrared (FLIR) dome 250 for protecting an infrared sensor from undesired microwave or millimeter wave radiation. First circular reflective element 210 is substantially disc-shaped with a central hole 219 therethrough along its longitudinal axis 213 which leads to a sensor. Front major surfacce 212 of first circular reflective element 210 has a plurality of concentric annular ridges 214 therein, each ridge 214 having a curved inclined ridge face 216. Inclined ridge faces 216 are shaped as spherical segments, all having the same center of curvature 229 located along the central longitudinal axis 213 a predetermined distance in front of first reflective element 210. Each inclined ridge face 216 has a predetermined width 215 which is substantially greater than the operating wavelength of the sensor so that infrared or shorter wavelength signals will be specularly reflected by ridge faces 216. As an example, to protect infrared and visible sensors which typically operate at wavelengths of about 3 $\mu$m (0.03 mm) or less against microwave radiation having wavelengths greater than about 3 mm, the inclined ridge face 216 may be about 0.3 mm wide. First circular reflective element 210 is positioned so that incoming signals from far field are caused to impinge on the front major surface 212 preferably essentially normal thereto.

Second circular reflective element 310 is positioned relative to the first circular reflective element 210 at less than half the distance to the center of curvature 229 with its front major surface 312 facing the front major surface 212 of first circular reflective element 210. Second circular reflective element 310 has a plurality of steps 314 therein, each step 314 having a reflecting face 316 of predetermined width 315 selected to be wide enough to specularly reflect infrared or shorter wavelength signals only. Width 315 of ridge faces 316 are about equal to width 215 of reflecting faces 216, which is about 0.3 mm.

In operation, undesired incoming microwave or millimeter wave signals, represented by signal ray 224, will impinge on first circularly reflective element 210 and typically be specularly reflected by the overall front major surface 217 out through dome window 251 of FLIR dome 250. However, should any incoming undesired radiation scatter towards second reflective element 310, it will typically be specularly reflected by overall major front surface 317 and directed out through dome window 251 as shown by signal ray 224'. On the other hand, desired infrared or shorter wavelength signals will impinge on first circular reflective element 210 and be directed by spherically shaped inclined ridge faces 216 toward second reflective element 310. Desired signals will impinge on second reflective element 310 and will typically be specularly reflected by reflecting faces 316 and directed into hole 219 in first circular reflective element 210.

In a further embodiment of the invention, FIG. 5 illustrates a honeycomb-like structure 400 for protecting sensors or electronic components. A plurality of hexagonal cells 402 are located adjacent to each other with their respective longitudinal axes 410 being essentially parallel. Each hexagonal cell 402 has six walls, 408 forming a ring-shaped hexagonal cell with a hole 412 therethrough. Furthermore, each hexagonal cell 402 has a length 404 and a width 406 which is the distance between diametrically opposing corners of the hexagonal cell 402.

The attenuation in each hexagonal honeycomb cell (or any waveguide beyond cutoff) is defined by the equation $K=K_o \exp(-\gamma l)$, where K is the magnetic or electric field of the electromagnetic radiation at the downstream end of the honeycomb structure, $K_o$ is the magnetic or electric field at the entrance of the cell, $\gamma$ is the propagation constant and l is the length of each cell. When the undesired microwave or millimeter wavelength is much greater than the cutoff wavelength of each cell, the attenuation in each cell is defined by the relationship $-\log K/K=2.73\ l/\lambda_c$. The cutoff wavelength $\lambda_c$ for each cell of the honeycomb is directly proportional to the maximum cross-sectional dimension of the cell. For a waveguide of circular cross section, the cutoff wavelength $\lambda_c$ is 1.73 times the diameter of the cross-section and for a square cross-section, $\lambda_c$ is twice the width of the cross-section. These relationships are given in L. G. Huxley, "A survey of the Principles and Practice of Waveguides", Cambridge 1947, Chp. 3. which is incorporated herein by reference.

With these relationships, the relationship between the length 404 and width 406 of the cell 402 can be derived for any preselected attenuation. As an example, for the hexagonal honeycomb-like structure to provide an attenuation of at least 80 db, the length of each hexagonal cell must be greater than about three times the diagonal width of the cells. Since the attenuation is dependent only on the relationship of length to width of the cell, the length of the cells can be made arbitrarily small. Consequently, the honeycomb-like structure can be more readily and easily shaped to various contours.

Each hexagonal cell 400 may be made of thin sheet metal about 10 mils thick. The inside of each cell may be coated with gold for high conductivity which in turn is blackened to reduce internal optical scattering. The honeycomb-like structure 400 is placed in front of sensor 420 or other electronic components for shielding these components from undesired pulses of electromagnetic energy.

Figure 6:
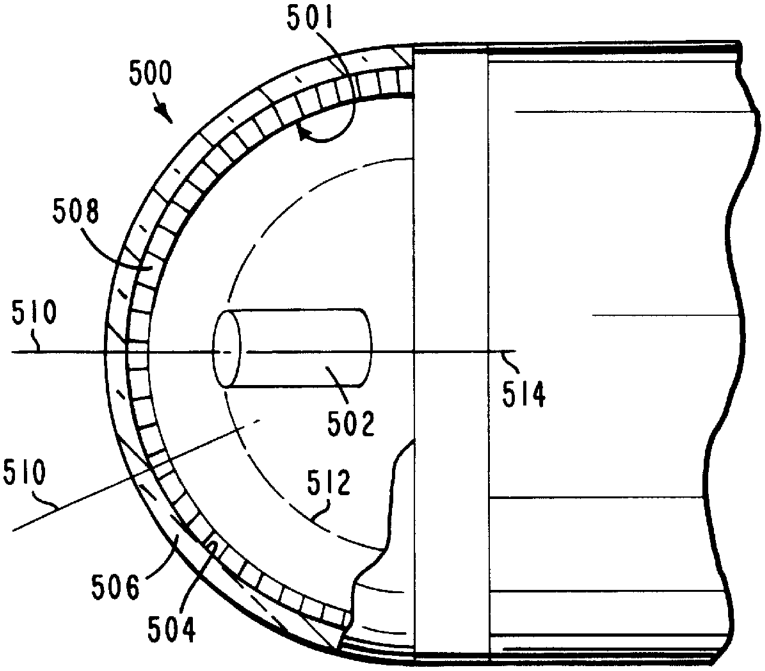

In the embodiment shown in FIG. 6, a honeycomb-like structure may be employed in a FLIR dome 500 to shield sensor 502 within, from undesired microwave or millimeter wave radiation. Honeycomb-like structure 501 is shaped to conform to the interior wall 504 of dome window 506. Sensor 502 typically rotates and scans along arc 512 such that its longitudinal axis 514 is aligned with the longitudinal axes 510 of individual cells 508.

In order to properly shape the honeycomb-like structure 501, a flat sheet of the honeycomb-like structure 400 is placed over a form having a contour similar to that of the interior 504 of the dome window 506. A rubber sheet is placed over the honeycomb-like structure, which in turn is pushed onto the honeycomb-like structure with hydraulic fluid, thereby pressing the honeycomb-like structure into the form shape.

Figure 7:
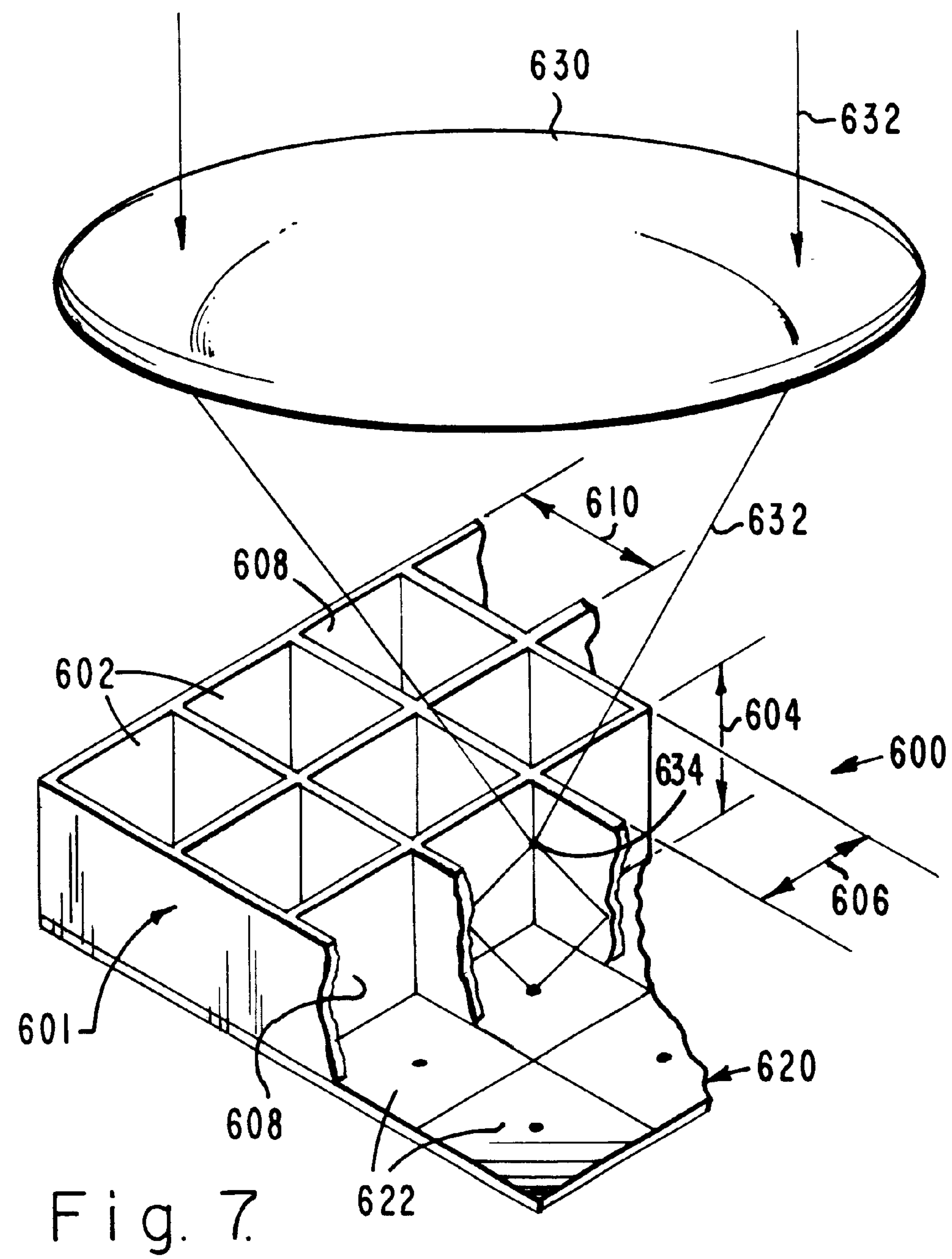
FIG. 7 is a perspective view of a focal plane array illustrating another example of the sensor protection arrangement in FIG. 5.

In another embodiment shown in FIG. 7, a honeycomb-like structure 601 may be used to shield a focal plane array 620 having a plurality of sensors 622. A honeycomb-like structure 601 composed of a plurality of adjacently located square cells 602 is placed in front of a focal plane array 620 wherein respective ones of the sensors 622 are substantially aligned with respective ones of square cells 602. The walls 608 of cells 602 have approximately the same width dimension 606 or 610 in the plane of the array 620, since focal plane array sensors are typically square. The width 606 and 610 is substantially less than one-half of the shortest wavelength of the radiation that is to be rejected. Furthermore, the length dimension 604 of each cell is preferably greater than about three times the width 606 and 610 of the cell for square cells. A focusing element 630 is typically positioned above the focal plane array 620 and has a focal plane which lies at about the entrances to the square cells 602. Image rays 632 are, therefore, focused at the entrance 634 of the cell. The interior walls are highly reflective to reflect the incoming rays 632 onto the sensors 622.

The honeycomb-like structure 601 may be manufactured onto focal plane array 620 by applying a photoresist mask with patterned openings around each sensor 622 and growing walls consisting of semiconductor material, such as silicon or gallium arsenide, vertically up from the focal plane array, thereby forming cell walls 608. In addition to hexagonal or square walls the honeycomb cells may be of thin geometrical shapes such as circular, rectangular or triangular, for example.

Moreover the honeycomb-like structure can be used to shield heat-dissipating devices. Since the honeycomb-like structure may be transparent to infrared radiation and fluid flow, it can be placed in the path of the heat exhaust. Heat can therefore flow from the device. However microwave or millimeter radiation can be blocked from the device.

It should be understood that although the invention has been shown and described with respect to particular embodiments, nevertheless various changes and modifications obvious to a person skilled in the art to which the invention pertains are deemed to live within the spirit and scope of the invention as set forth in the appended claims.

What is claimed is:

1. An electromagnetic shielding device for screening undesired microwave or millimeter wave signals from sensors comprising:

a reflecting element having a front major surface with a plurality of parallel ridges therein, each ridge having an inclined ridge face of a predetermined width which is substantially less than undesired microwave or millimeter wave signals and substantially greater than the wavelength of desired signals and further being sloped to reflect desired signals impinging thereon in a first predetermined direction while undesired signals impinging on said front major surface are reflected reflected thereby in a second predetermined direction; and a transparent block having at least one reflective surface and positioned for receiving the desired signals reflected from said reflecting element and directing said desired signals toward a sensor.

2. An electromagnetic shielding device as defined in claim 1 wherein said predetermined width is less than about one-half the wavelength of said undesired signals and greater than about twice the wavelength os said desired signals.

3. A device for protecting sensors from undesired microwave or millimeter wave signals, comprising:

a first reflecting element having a first front major surface with a plurality of parallel first ridges therein, each first ridge having an inclined first ridge face of a predetermined width substantially less than the wavelength of undesired microwave or millimeterwave signals for reflecting desired signals having wavelengths substantially less than said predetermined width, said inclined first ridge faces being sloped for receiving and reflecting desired signals in a first predetermined direction, and the first front major surface being oriented to reflect undesired signals in a second predetermined direction; and a second reflecting element having a second front major surface with a plurality of parallel second ridges therein, each second ridge having an inclined second ridge face of a preselected width substantially less than the wavelength of undesired signals for reflecting desired signals having wavelengths substantially less than said preselected width, said second inclined ridge faces being sloped for receiving desired signals from said first reflecting element and reflecting these signals toward a sensor, said second front major surface being oriented to reflect undesired signals reflected thereon from said first front major surface of said first reflecting element away from the sensor.

4. A sensor protection device as defined in claim 3 wherein the widths of said inclined ridge faces of said first and second reflecting elements are less than about one-half the wavelength of said undesired signals and greater than about twice the wavelength of said desired signals.

5. A device for protecting sensors from undesired microwave or millimeter wave signals comprising:.

a first substantially disc-shaped circular reflecting element having a hole therethrough along its central longitudinal axis, said reflecting element having a first major surface which has a plurality of concentric annular ridges therein, each ridge having a spherical segment shaped inclined ridge face, said ridge faces having a common focal plane located a predetermined distance in front of said first major surface along said central longitudinal axis, said inclined ridge faces having a predetermined width substantially less than undesired microwave or millimeter wave signals and substantially greater than the wavelength of desired signals for specularly reflecting desired signals, said inclined ridge faces being shaped so that desired signals impinging upon said front major surface along a direction substantially parallel to said longitudinal axis will be reflected toward said common focal plane and undesired signals will be reflected by said first major surface away from the sensor; and a second substantially disc-shaped circular reflecting element having another front major surface which has a plurality of concentric steps therein, each step having a reflecting face of predetermined width substantially less than the wavelength of undesired signals, said second reflecting element being disposed along said central longitudinal axis with said reflecting faces facing said first major surface such that desired signals reflected from said inclined ridge faces of said first circular reflecting element toward said focal plane will be reflected by said reflecting faces of said second reflecting element toward said hole while undesired signals will be reflected by said another front major surface of said second reflecting element away from said hole.

6. A device for protecting sensors from undesired microwave or millimeter wave signals comprising:

a first substantially disc-shaped reflecting element having a hole therethrough along its central longitudinal axis, said reflecting element having a first major surface which has a plurality of concentric ridges therein, each ridge having a spherical segment shaped inclined ridge face, said ridge faces having a common focal plane located a predetermined distance in front of said first major surface along said longitudinal axis, said inclined ridge faces having a predetermined width less than about one-half the wavelength of undesired signals and greater than about twice the wavelength of desired signals for specularly reflecting desired signals, said inclined ridge faces being sloped so that desired signals impringing upon said front major surface along a direction substantially parallel to said central longitudinal axis will be reflected toward said common focal plane and undesired signals will be reflected by said first major surface away from the sensor; and a second substantially disc-shaped reflecting element having another front major surface which has a plurality of concentric steps therein, each step having a reflecting face of a predetermined width less about one-half the wavelength of undesired signals and greater than about twice the wavelength of desired signals for specularly reflecting desired signals, said second reflecting element being disposed along said central longitudinal axis with said reflecting faces facing said first major surface of said first reflecting element such that desired signals reflected from said first reflecting element toward said second reflecting element will be reflected by said reflecting faces toward said hole in said first reflecting element while undesired signals will be reflected by said another front major surface away from the sensor.

7. A device for substantially attenuating undesired microwave or millimeter wave signals, comprising:

a honeycomb-like structure having a plurality of adjacent square-shaped cells having four walls, the width of each wall being about twice a predetermined cut-off wavelength of the millimeter or microwave signals and the length of each cell being about three times said width to substantially attenuate microwave or millimeter wave radiation and further allow desired signals to pass through, wherein said cell walls are formed from semiconductor material, and a plurality of sensors, respective ones of said sensors being located behind respective ones of said square-shaped cells, wherein said plurality of sensors is a focal plane array, and said cell walls are grown on said focal plane array.

8. A device for shielding electronic components from undesired microwave or millimeter wave radiation, comprising:

an outer dome structure having an interior wall;

a sensor having a longitudinal axis located within said dome and capable of rotation along an arc;

a honeycomb-like structure shaped to conform to the interior wall of said dome, said honeycomb-like structure having a plurality of adjacent cells, each having a longitudinal axis and a predetermined cross-sectional area and length selected to substantially attenuate microwave or millimeter wave radiation and to allow infrared signals to pass therethrough substantially unattenuated.

9. The device of claim 8, wherein the sensor and honeycomb-like structure are positioned with respect to each other such that the longitudinal axis of said sensor is aligned with the respective longitudinal axis of the respective cell as the sensor rotates.

* * * * *